United States Patent [19]
Matsuo

[11] 4,274,711
[45] Jun. 23, 1981

[54] BRIGHT PHOTOGRAPHIC LENS SYSTEM WITH REAR STOP DIAPHRAGM

[75] Inventor: Hirohumi Matsuo, Asaka, Japan

[73] Assignee: Asahi Kogaku Kogyo Kabushiki Kaisha, Tokyo, Japan

[21] Appl. No.: 94,620

[22] Filed: Nov. 15, 1979

[30] Foreign Application Priority Data

Dec. 27, 1978 [JP] Japan .................. 53/163316

[51] Int. Cl.³ ............................................. G02B 9/62
[52] U.S. Cl. ................................................... 350/464
[58] Field of Search ........................................ 350/215

[56] References Cited
U.S. PATENT DOCUMENTS 2,861,500  11/1958  Tronnier ..................... 350/215

FOREIGN PATENT DOCUMENTS 43-476980  11/1968  Japan .

*Primary Examiner*—Paul A. Sacher
*Attorney, Agent, or Firm*—Sughrue, Rothwell, Mion, Zinn and Macpeak

[57] ABSTRACT

A photographic lens system such as a telescopic lens system adapted for use with a rear stop diaphragm in which the backfocus is about 0.3F, the F number is about F/2.8, the system is small in size and aberrations are well compensated for. Front and rear lens groups are provided with the front group including in order from the object positive, negative, positive and positive lenses while the rear group includes negative and positive lenses. Preferred focal lengths, radii of curvature, refractive indices, and Abbe numbers for each of the lenses are disclosed.

3 Claims, 9 Drawing Figures

SPHERICAL ABERRATION

SINE CONDITION

CHROMATIC ABERRATION

DISTORTION

ASTIGMATISM

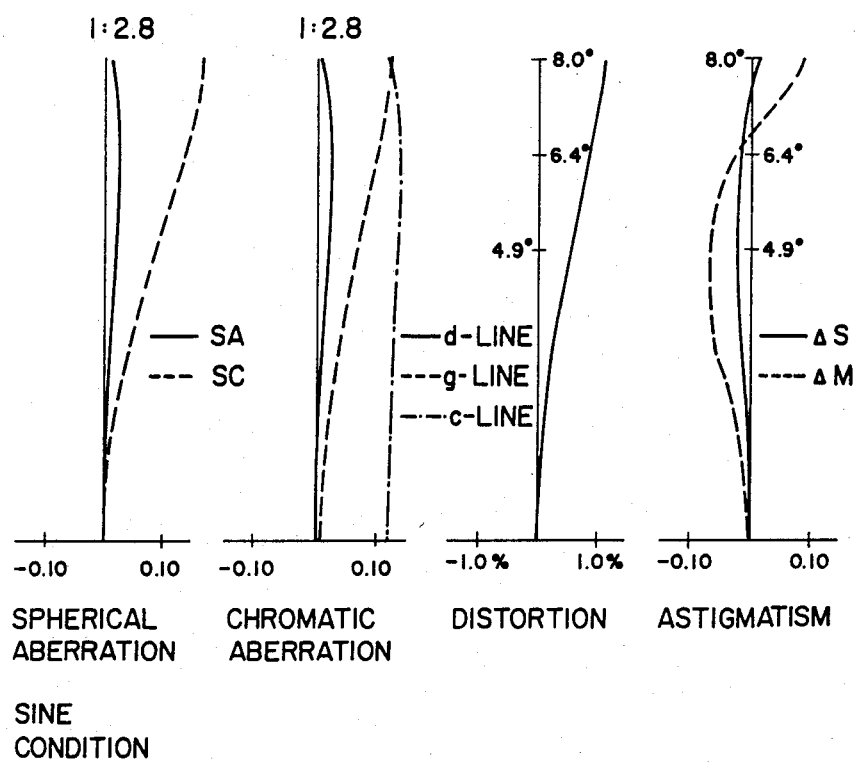

BRIGHT PHOTOGRAPHIC LENS SYSTEM WITH REAR STOP DIAPHRAGM

BACKGROUND OF THE INVENTION

1. Field of the Invention

The present invention relates to a lens system with a rear stop diaphragm.

2. Description of the Prior Art

In most ordinary photographic lenses, a stop diaphragm is provided between selected lenses within the lens system. It is, however, necessary to dispose a stop diaphragm behind the lenses, that is, in the body of the camera, in order to facilitate the operational construction of the camera mechanism. In such a lens system with a rear stop diaphragm, generally the aperture of a first lens group increases and it is therefore difficult to produce a lens system where various aberrations are well compensated for or corrected.

Ordinary telephoto lenses are so contructed that front lens groups thereof have total positive lens powers while rear lens groups thereof have total negative lens powers. In order to miniaturize such lens systems, in general, the respective powers of the front and rear lens groups are increased and in addition, the space between the front and rear lens groups is increased. That is, the physical length from the rear lens group to the focussed image surface or the "backfocus" is shortened to thereby reduce the overall length from a first surface of the front lens group to the image surface. However, in most lens systems having rear stop diaphragms it is considered that possible minimum backfocuses have already be attained. In this case, the increase of the power of each lens group is substantially the same as the decrease of the space between the front and rear lens groups. Moreover, the edge thickness of each positive lens is too small. For this reason, as a practical matter, the central thickness of the positive lens must be increased resulting in elongation of the front lens group. For a beam of light passing through the most peripheral portion of the first lens, a higher incident height is required for the front lens group. This leads to difficulties in miniaturizing the physical size of the lens system.

SUMMARY OF THE INVENTION

It is, therefore, the principal object of the present invention to provide a lens system with a rear stop diaphragm, specifically one in which the backfocus is about 0.3F, the F number is about F/2.8, the overall lens system is relatively small in size, and various aberrations are well compensated for over all the picture surface. Here, F represents the overall focal length.

For the lens system according to the present invention, the front lens group includes in order from the object, positive, negative, positive, and positive lenses and the rear lens group includes, in order, of negative and positive lenses. The lens system includes six lens elements grouped into six components and satisfying the following conditions.

(1) $0.45F < F_{1.2.3.4} < 0.6F$
(2) $-2.1F < F_2 < -1.7F$
(3) $-2.5 < r_2 < -1.5F$, $0.8F < r_8 < 1.5F$, $-F < r_2 + r_8 < -0.6F$
(4) $-1.5F < r_3 < -F$, $F < r_9 < 1.5F$, $-0.2F < r_3 + r_9 < 0.2F$
(5) $d_8 < 0.1F$ where:

F is the overall focal length,
$F_{1.2...i}$ is the focal length to the i-th lens,
$F_i$ is the focal length of the i-th lens,
$r_j$ is the radius of curvature of the j-th lens,
$d_j$ is the lens thickness or the aerial space of the j-th lens,
$\omega$ is the half view angle,
$n_i$ is the refractive index of the i-th lens at the d-line, and
$v_i$ is the Abbe number of the i-th lens.

BRIEF DESCRIPTION OF THE INVENTION

The specific nature of the invention, as well as other object, aspects, uses and advantages thereof, will clearly appear from the following description and from the accompanying drawings, in which:

FIGS. 3A to 3D show aberration curves obtained by the lens system in accordance with the second embodiment of the invention.

DETAILED DESCRIPTION OF THE INVENTION

Figure 1:
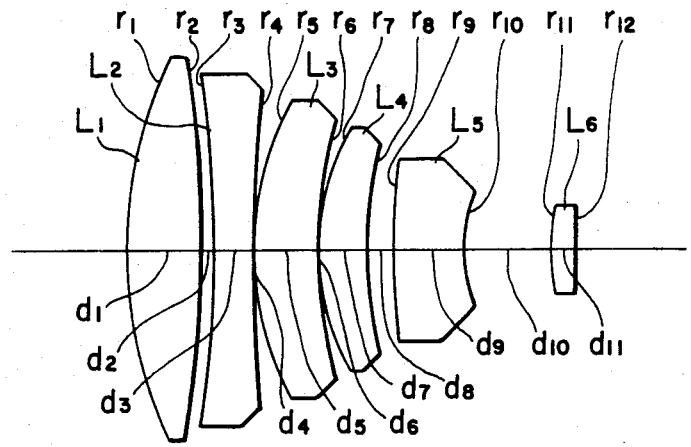
FIG. 1 is a longitudinal view showing the lens system in accordance with the first embodiment of the invention.
Figures 2A, 2B, 2C, 2D:
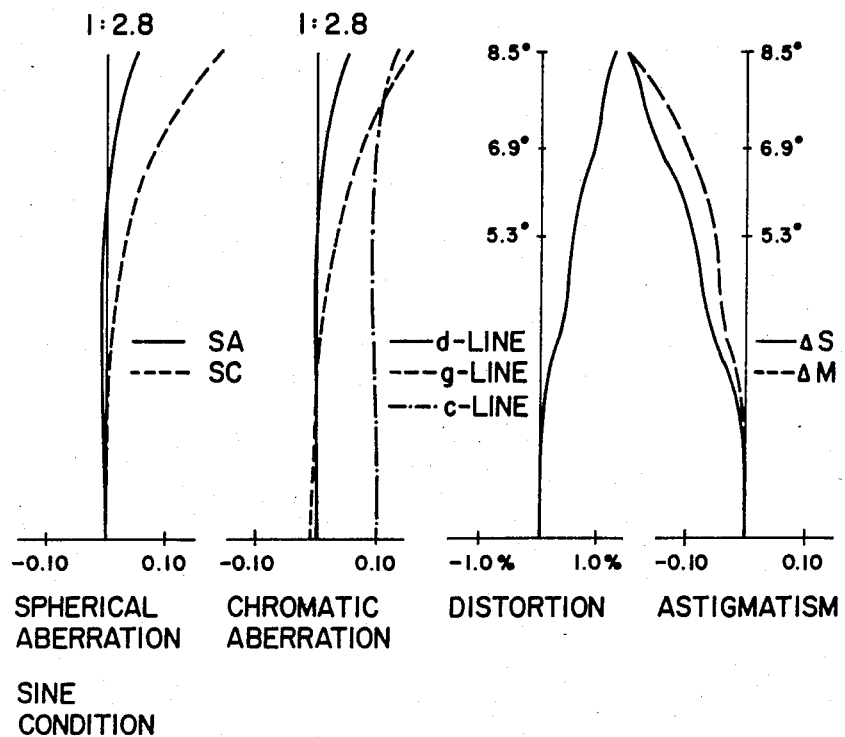
FIGS. 2A to 2D show aberration curves obtained by the lens system in accordance with the first embodiment of the invention.

According to the present invention, as shown in FIG. 1, there is provided a lens system including a front lens group and a rear lens group, the front lens group including in order from the object a positive lens component $L_1$, a negative lens component $L_2$, a positive lens component $L_3$ and a positive lens component $L_4$. The rear lens group includes, in this order, a negative lens $L_5$ and positive lens $L_6$. The focal length according to the overall lens system may be varied by moving the lenses $L_1$ to $L_4$ in the front lens group.

The lens system according to the invention is characterized by the following five conditions as noted below, which will be described in greater detail later:

(1) $0.45F < F_{1.2.3.4} < 0.6F$
(2) $-2.1F < F_2 < -1.7F$
(3) $-2.5 < r_2 < -1.5F$, $0.8F < r_8 < 1.5F$, $-F < r_2 + r_8 < -0.6F$
(4) $-1.5F < r_3 < -F$, $F < r_9 < 1.5F$, $-0.2F < r_3 + r_9 < 0.2F$
(5) $d_8 < 0.1F$ wherein the terms in the inequalities are as defined previously.

In the lens system according to the invention, the telephoto ratio is about 1.0, the various aberrations are well corrected by the conditions (1) to (5), and the lens system may readily be miniaturized.

Condition (1)

$$0.45F < F_{1.2.3.4} < 0.6F$$

This condition is required for determining the focal length of the first lens group. If the focal length of the first lens group were smaller than the lower limit, the diameter of the first lens would increase resulting in an undesirable balance of the lens construction and at the same time making it impossible to provide good aberration compensation. If the focal length of the front lens group becomes larger than the upper limit, the overall length of the lens system is elongated.

Condition (2)

$$-2.1F < F_2 < -1.7F$$

This condition renders the second lens negative so that in the front lens group having as a whole a positive focal length, the chromatic aberration which may be deficient in compensation can be excessively compensated for. When the value of $F_2$ undesirably deviates from lower and upper limits of the range, the chromatic aberration is extremely deficiently or excessively compensated for.

Condition (3)

$$-2.5F < r_2 < -1.5F,\ 0.8F < r_8 < 1.5F,$$
$$-F < r_2 + r_8 < -0.6F$$

In the lens system according to the present invention, a part of the power of the first lens group is loaded on the third lens $L_3$. However, a substantial part of the ability to compensate for the aberration depends on the first and fourth lenses $L_1$, $L_4$. The condition (3) is provided to share the aberrations with a good balance under the condition (1). The condition (3) is required to obtain good aberration compensation together with the following condition (4).

Condition (4)

$$-1.5F < r_3 < -F,\ F < r_9 < 1.5F,$$
$$-0.2F < r_3 + r_9 < 0.2F$$

With respect to the aberrations generated due to the condition (3), the second lens $L_2$ which is provided to compensate for the chromatic aberration, serves to largely compensate for aberration except for chromatic aberration. In this case, the condition (4) is required to balance the function of the second lens $L_2$ with the fifth lens $L_5$ disposed in the rear lens group so that the good aberration compensation can be totally achieved without excessive aberration loading on a specific lens. In addition, this makes it possible that in the focussing operation of this lens system, only the front lens group need be moved while the rear lens group remains stationary to thereby vary the overall focal length. However, if an excessive amount of aberration is concentrated on a specific lens in the front and rear lens groups, focussing by use of only the front lens group results in the possibility that the balance of the aberrations is destroyed which is of course undesirable. In such a focussing technique, the amount of movement of the lens is small in comparison with a focussing technique in which the focussing is carried out with the overall lens system. Since the variation of the light ray passing through the outermost portion of the lens is small, the diameter of the front lens in the front group moving focussing lens system can be maintained small. This is advantageous for miniaturization of the lens system.

Condition (5)

$$d_8 < 0.1F$$

This condition also relates to the miniturization or compactness. When the value of $d_8$ increases more than the upper limit, the diameter of the front lens group must be great and at the same time the overall length must be increased.

Two examples of lens systems in accordance with the invention will now be given. The lens data in Examples 1 and 2 according to the present invention are given below for a lens system with a resultant focal length of $F = 100$.

EXAMPLE 1

Aperture Ratio 1:2.8, Overall Focal Length $F = 100$, Viewing Angle $2\omega = 17°$

| | Radius of Curvature | Distance or Thickness | Refractive Index | Abbe Number |
|---|---|---|---|---|
| $L_1$ | $r_1 = 65.3546$ | $d_1 = 12.701$ | $n_1 = 1.5687$ | $\nu_1 = 63.2$ |
| | $r_2 = -180.5426$ | $d_2 = 2.303$ | | |
| $L_2$ | $r_3 = -156.0779$ | $d_3 = 5.778$ | $n_2 = 1.6034$ | $\nu_2 = 38.0$ |
| | $r_4 = 308.9377$ | $d_4 = 0.286$ | | |
| $L_3$ | $r_5 = 48.4589$ | $d_5 = 10.269$ | $n_3 = 1.5687$ | $\nu_3 = 63.2$ |
| | $r_6 = 74.0163$ | $d_6 = 0.286$ | | |
| $L_4$ | $r_7 = 38.5400$ | $d_7 = 8.310$ | $n_4 = 1.5163$ | $\nu_4 = 64.1$ |
| | $r_8 = 81.0961$ | $d_8 = 4.134$ | | |
| $L_5$ | $r_9 = 159.3317$ | $d_9 = 12.315$ | $n_5 = 1.7408$ | $\nu_5 = 27.8$ |
| | $r_{10} = 21.6571$ | $d_{10} = 14.832$ | | |
| $L_6$ | $r_{11} = 51.8114$ | $d_{11} = 4.005$ | $n_6 = 1.6727$ | $\nu_6 = 32.1$ |
| | $r_{12} = -385.0579$ | | | |

EXAMPLE 2

Aperture Ratio 1 : 2.8, Overall Focal Length $F = 100$, Viewing Angle $2\omega = 16°$

| | Radius of Curvature | Distance or Thickness | Refractive Index | Abbe Number |
|---|---|---|---|---|
| $L_1$ | $r_1 = 93.2262$ | $d_1 = 9.300$ | $n_1 = 1.5687$ | $\nu_1 = 63.2$ |
| | $r_2 = -191.1157$ | $d_2 = 3.557$ | | |
| $L_2$ | $r_3 = -116.3420$ | $d_3 = 1.586$ | $n_2 = 1.7282$ | $\nu_2 = 28.5$ |
| | $r_4 = -1359.9035$ | $d_4 = 0.107$ | | |
| $L_3$ | $r_5 = 47.7816$ | $d_5 = 6.395$ | $n_3 = 1.5687$ | $\nu_3 = 63.2$ |
| | $r_6 = 93.2662$ | $d_6 = 0.133$ | | |
| $L_4$ | $r_7 = 27.6468$ | $d_7 = 11.352$ | $n_4 = 1.5163$ | $\nu_4 = 64.1$ |
| | $r_8 = 127.9306$ | $d_8 = 8.407$ | | |
| $L_5$ | $r_9 = 134.5698$ | $d_9 = 1.612$ | $n_5 = 1.6727$ | $\nu_5 = 32.1$ |
| | $r_{10} = 15.9485$ | $d_{10} = 18.014$ | | |
| $L_6$ | $r_{11} = 35.3386$ | $d_{11} = 2.691$ | $n_6 = 1.8052$ | $\nu_6 = 25.4$ |
| | $r_{12} = 67.7565$ | | | |

What is claimed is:

1. A lens system comprising front and rear lens groups, said front lens group comprising, in order from the object, a first positive lens $L_1$, a second negative lens $L_2$, a third positive lens $L_3$ and a fourth positive lens $L_4$, and said rear lens group comprising, in order from the object, a fifth negative lens $L_5$ and a sixth positive lens $L_6$, said lenses being characterized by:

Aperture Ratio 1:2.8, Overall Focal Length $F = 100$, Viewing Angle $2\omega = 17°$

| | Radius of Curvature | Distance or Thickness | Refractive Index | Abbe Number |
|---|---|---|---|---|
| $L_1$ | $r_1 = 65.3546$ | $d_1 = 12.701$ | $n_1 = 1.5687$ | $\nu_1 = 63.2$ |
| | $r_2 = -180.5426$ | $d_2 = 2.303$ | | |
| $L_2$ | $r_3 = -156.0779$ | $d_3 = 5.778$ | $n_2 = 1.6034$ | $\nu_2 = 38.0$ |
| | $r_4 = 308.9377$ | $d_4 = 0.286$ | | |
| $L_3$ | $r_5 = 48.4589$ | $d_5 = 10.269$ | $n_3 = 1.5687$ | $\nu_3 = 63.2$ |

-continued

| Aperture 1:2.8, Ratio | | Overall Focal Length F = 100, | Viewing $2\omega = 17°$ Angle | |
|---|---|---|---|---|
| | Radius of Curvature | Distance or Thickness | Refractive Index | Abbe Number |
| | $r_6 = 74.0163$ | $d_6 = 0.286$ | | |
| $L_4$ | $r_7 = 38.5400$ | $d_7 = 8.310$ | $n_4 = 1.5163$ | $\nu_4 = 64.1$ |
| | $r_8 = 81.0961$ | $d_8 = 4.134$ | | |
| $L_5$ | $r_9 = 159.3317$ | $d_9 = 12.315$ | $n_5 = 1.7408$ | $\nu_5 = 27.8$ |
| | $r_{10} = 21.6571$ | $d_{10} = 14.832$ | | |
| $L_6$ | $r_{11} = 51.8114$ | $d_{11} = 4.005$ | $n_6 = 1.6727$ | $\nu_6 = 32.1$ |
| | $r_{12} = -385.0579$ | | | |

2. A lens system comprising front and rear lens groups, said front lens group comprising, in order from the object, a first positive lens $L_1$, a second negative lens $L_2$, a third positive lens $L_3$ and a fourth positive lens $L_4$, and said rear lens group comprising, in order from the object, a fifth negative lens $L_5$ and a sixth positive lens $L_6$, said lenses being characterized by:

| Aperture Ratio 1 : 2.8, Overall Focal Length F = 100, Viewing Angle $2\omega = 16°$ | | | | |
|---|---|---|---|---|
| | Radius of Curvature | Distance or Thickness | Refractive Index | Abbe Number |
| $L_1$ | $r_1 = 93.2262$ | $d_1 = 9.300$ | $n_1 = 1.5687$ | $\nu_1 = 63.2$ |
| | $r_2 = -191.1157$ | $d_2 = 3.557$ | | |
| $L_2$ | $r_3 = -116.3429$ | $d_3 = 1.586$ | $n_2 = 1.7282$ | $\nu_2 = 28.5$ |
| | $r_4 = -1359.9035$ | $d_4 = 0.107$ | | |
| $L_3$ | $r_5 = 47.7816$ | $d_5 = 6.395$ | $n_3 = 1.5687$ | $\nu_3 = 63.2$ |
| | $r_6 = 93.2662$ | $d_6 = 0.133$ | | |
| $L_4$ | $r_7 = 27.6468$ | $d_7 = 11.352$ | $n_4 = 1.5163$ | $\nu_4 = 64.1$ |
| | $r_8 = 127.9306$ | $d_8 = 8.407$ | | |
| $L_5$ | $r_9 = 134.5698$ | $d_9 = 1.612$ | $n_5 = 1.6727$ | $\nu_5 = 32.1$ |
| | $r_{10} = 15.9485$ | $d_{10} = 18.014$ | | |
| $L_6$ | $r_{11} = 35.3386$ | $d_{11} = 2.691$ | $n_6 = 1.8052$ | $\nu_6 = 25.4$ |
| | $r_{12} = 67.7565$ | | | |

3. A lens system according to claims 1 or 2, wherein said front lens group is moved for focussing operations.

* * * * *